United States Patent
Bittles et al.

(10) Patent No.: US 9,569,285 B2
(45) Date of Patent: Feb. 14, 2017

(54) METHOD AND SYSTEM FOR MESSAGE HANDLING

(75) Inventors: William Bittles, Winchester (GB);
David Granshaw, Fair Oak (GB); John B. Pickering, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 13/027,041

(22) Filed: Feb. 14, 2011

(65) Prior Publication Data

US 2011/0208820 A1 Aug. 25, 2011

(30) Foreign Application Priority Data

Feb. 12, 2010 (EP) ..................................... 10153453

(51) Int. Cl.
*G06F 15/16* (2006.01)
*G06F 9/54* (2006.01)

(52) U.S. Cl.
CPC ..................................... *G06F 9/541* (2013.01)

(58) Field of Classification Search
USPC ........................................................ 709/206
See application file for complete search history.

(56) References Cited

U.S. PATENT DOCUMENTS

| 8,020,029 B2* | 9/2011 | Aggarwal et al. ................ 714/2 |
| 2005/0228865 A1* | 10/2005 | Hirsch .......................... 709/206 |
| 2009/0070487 A1* | 3/2009 | Reed ............................. 709/238 |
| 2009/0144357 A1* | 6/2009 | Cope et al. .................... 709/202 |
| 2009/0240777 A1* | 9/2009 | De Meyer et al. ........... 709/206 |
| 2010/0011076 A1* | 1/2010 | Shkolnikov et al. ......... 709/206 |
| 2010/0011078 A1* | 1/2010 | Shkolnikov et al. ......... 709/206 |
| 2011/0208820 A1* | 8/2011 | Bittles et al. ................. 709/206 |

* cited by examiner

*Primary Examiner* — Monica C King
(74) *Attorney, Agent, or Firm* — Steven M. Greenberg, Esq.; CRGO Law

(57) ABSTRACT

A method and system for message handling wherein a structured message is transmitted as a reduced message with the structure removed. The method includes: monitoring messages to be transmitted, the step of monitoring comprising: for each message, identifying one or more elements within the message and identifying the format of content and/or structure encapsulated by those elements; determining the probability that a message will conform to a previously identified format; and using the determined probability to decide when to transmit a format template for the message, wherein the format template is for use by a destination to add the structure removed by a message source back into the message.

23 Claims, 10 Drawing Sheets

METHOD AND SYSTEM FOR MESSAGE HANDLING

CROSS-REFERENCE TO RELATED APPLICATIONS

This application claims priority under 35 U.S.C. §119(a) to European Patent Application Serial Number 10153453.5, filed Feb. 12, 2010, entitled "METHOD AND SYSTEM FOR MESSAGE HANDLING", the entirety of which is incorporated herein by reference.

FIELD OF THE INVENTION

This invention relates to the field of message handling. In particular, the invention relates to message handling with adaptive formatting.

BACKGROUND OF THE INVENTION

Typically, when one computer or computer program communicates with another, then the two entities exchange messages. To enable message interpretation, an agreed format is often used. One such format is the standard eXtensible MarkUp Language (XML) format, although other standards as well as proprietary formats are also used.

The format generally identifies specific non-content tags or elements which identify the function or interpretation of the information contained within the tags or elements. The recipient of such messages typically uses the tags or elements to parse the incoming message and thereby extract the data part or information content of the message.

In practice, using such formatting provides great flexibility, not least because a message effectively carries with it sufficient information to allow for whatever processing needs to be done to extract the actual message content. However, the disadvantage is that the messages increase in size with content in the form of the formatting. This may detrimentally affect performance in terms of message throughput and communication link bandwidth.

SUMMARY OF THE INVENTION

According to a first aspect of the present invention there is provided a method for message handling, wherein a structured message is transmitted as a reduced message with the structure removed, the method comprising: monitoring messages to be transmitted, the step of monitoring comprising: for each message, identifying one or more elements within the message and identifying the format of content and/or structure encapsulated by those elements; determining the probability that a message will conform to a previously identified format; and using the determined probability to decide when to transmit a format template for the message, wherein the format template is for use by a destination to add the structure removed by a message source back into the message.

According to a second aspect of the present invention there is provided a method for message handling, wherein a structured message is received as a reduced message with the structure removed, the method comprising: receiving a template at a message receiver; comparing the template to other templates received at the message receiver to ascertain a probability of format similarity; receiving a reduced message and reconstructing the reduced message using a most recently received template; determining if the probability of the template matching the reduced message is within a predetermined threshold; if the probability is not within the threshold, reconstructing the reduced message using other templates of format similarity; and keeping the reconstructed message of the template with the highest probability.

According to a third aspect of the present invention there is provided a computer software product for message handling wherein a structured message is transmitted as a reduced message with the structure removed, the product comprising a computer-readable storage medium, storing a computer in which program comprising computer-executable instructions are stored, which instructions, when read and executed by a computer, perform the following steps: monitoring messages to be transmitted, the step of monitoring comprising: for each message, identifying one or more elements within the message and identifying the format of content and/or structure encapsulated by those elements; determining the probability that a message will conform to a previously identified format; and using the determined probability to decide when to transmit a format template for the message, wherein the format template is for use by a destination to add the structure removed by a message source back into the message.

According to a fourth aspect of the present invention there is provided a system for message handling, wherein a structured message is transmitted as a reduced message with the structure removed, comprising: one or more stored format templates for a message based on the structure and content of a message; a message processing component for monitoring messages to be transmitted including: for each message, identifying one or more elements within the message and identifying the format of content and/or structure encapsulated by those elements; determining the probability that a message will conform to a stored format template; and a format changing component using the determined probability to decide when to transmit a format template for the message, wherein the format template is for use by a destination to add the structure removed by a message source back into the message.

BRIEF DESCRIPTION OF THE DRAWINGS

Embodiments of the present invention will now be described, by way of example only, and with reference to the following drawings.

DETAILED DESCRIPTION OF THE INVENTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practised without these specific details. In other instances, well-known methods, procedures, and components have not been described in detail so as not to obscure the present invention.

A method and system are described for dynamically generating a format generalising algorithm for use as an extension to a communication protocol stack to reduce messages to their raw data content. The method and system also allow adaptive learning of how to reformat messages for efficient transmission and extensions to communication protocols in client-server or peer-to-peer communications.

The described method includes querying and modelling typical message structures. This includes: looking for the generic structure in terms of tagging and nesting; extracting content patterns; and attributing likelihood or probability scores to each of the message elements. The method then stores and distributes the resulting "template" for local and server-side message processing. Message cut-down at the sender's side and reconstitution at the recipient's side effectively become part of the overall protocol stack for improved performance.

When two systems or programs communicate, they will often do so via message exchange. Messages are transmitted typically via some communication link, such as a network. Managing communication across such a link is via a set of layered protocols: a protocol stack. For example, a protocol stack may have the following layers: Application, Transport, Internet, and Link, with the physical link—the "copper wire" at the logical bottom of the stack. Protocol stacks exist outside the Internet and another example may include the layers: Application, Presentation, Session, Transport, Network, Data Link, and the Physical Layer as in the Open System Connection model. Message data will typically pass through the application interface to the transport layer, be handed off to the Internet or Network layer and finally be submitted to the physical link. Each of these layers will add layer-specific header and footer information to "frame" the data as it is passed from layer to layer and then finally over the physical link. This set of activities is shown in FIG. 1A.

Figure 1A:
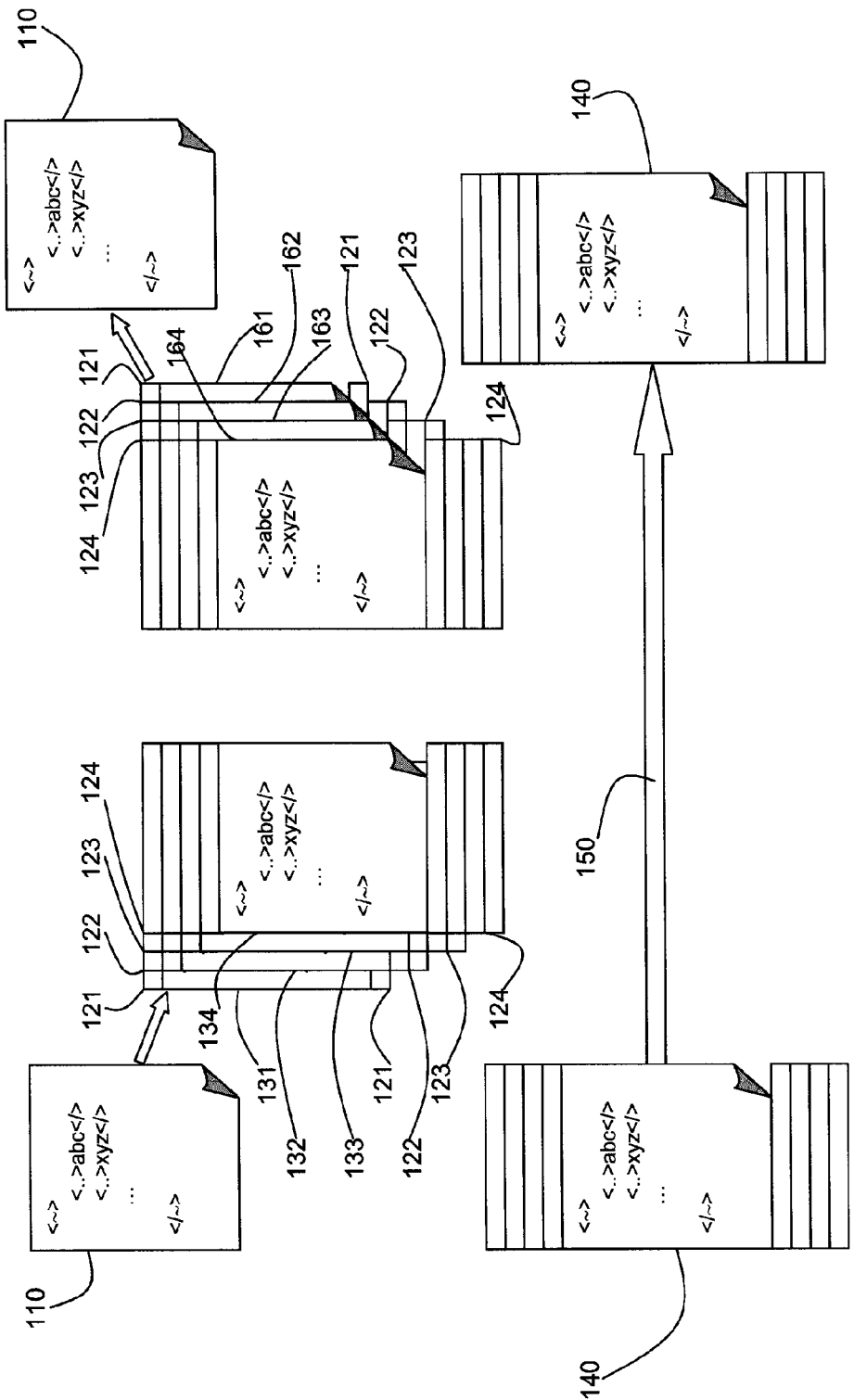
FIGS. 1A to 1C are schematic diagrams showing message handling.

Referring to FIG. 1A, a known message handling is schematically illustrated. A structured message 110 is passed to the protocol stack. Each protocol layer 131, 132, 133, 134 of the stack adds its framing (control) information 121, 122, 123, 124 to the message 110. The final form of the message 140 is sent across the physical link 150.

At the receiving end, a same protocol stack with equivalent protocol layers 161, 162, 163, 164 is assumed to be in place and the framing 121, 122, 123, 124 information is removed before the structured message 110 is made available to the receiving program or application.

In the message 110, the structural information is shown in markup languages enclosed within corresponding opening and closing angled brackets "< . . . ></ . . . >" and the actual information content is enclosed between the beginning and ending tags. The tags themselves provide the message recipient with appropriate information for how the message is to be interpreted. The tags explain how the data content is to be used or understood. The tags may refer to specific fields within a message, such as date and time, or to control data relating to the protocol layer.

Markup languages are the most common method for message structuring and content identification. However, the same principles apply to other structured types, such as pre-defined record types and so forth. The layers of the protocol stack will tend to provide information at specific locations—like bits 0-3; 4-20 . . . etc. In such cases, an external "source" (such as a definition in a header file) is required to show where the data are to be found.

It is not always necessary to transmit the structural information for each message. Although this allows for maximal flexibility in message content, it is possible for the sender and recipient to agree a common format for any message or message set.

The described method and system extend message handling to introduce additional and adaptive flexibility to the message exchange system. There are three basic parts:

Extract and maintain the structural information of messages transmitted from the sender;

Identify the structural information with outgoing (sender to recipient) message flows; and Identify the structural information for potential incoming (recipient from sender) message flows.

Figure 1B:
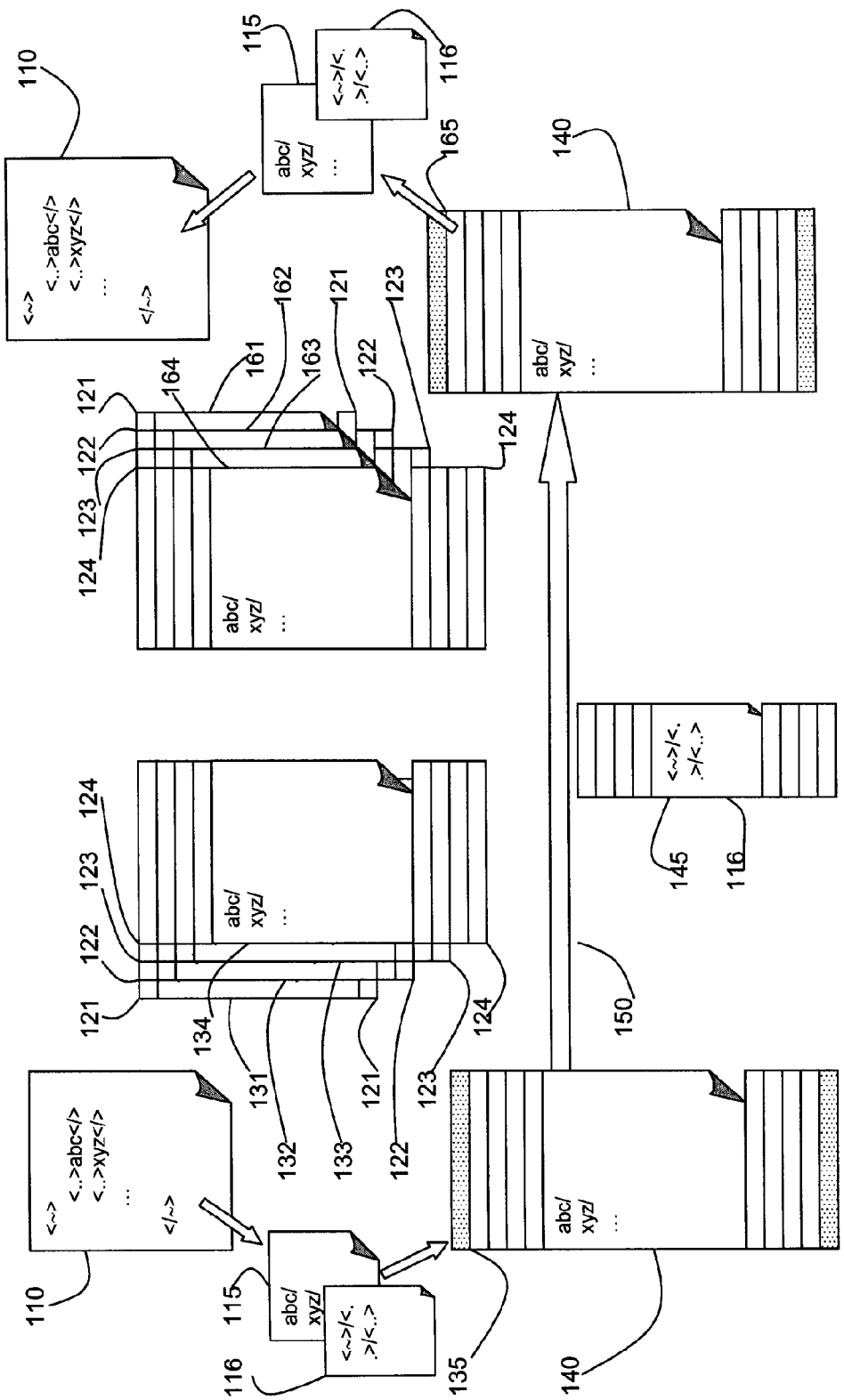

Referring to FIG. 1B, a described message handling is shown in which the structural tags are dropped from the physical messages 110 to produce a reduced message 115 of raw content for onward transmission. Effectively, an additional protocol layer 135 has been produced. Again, the assumption is that the recipient has the opposite of this layer 165 to be able to reconstitute the message 110.

As the message 110 is being processed to generate the reduced message 115 with no formatting, the formatting information itself is retained as a template 116 for message restructuring given the reduced message 115. The form of the template 116 is described in detail with reference to FIG. 1C below. The term template is used throughout this description and is intended to include algorithms for the structural information.

The template 116 is now stored as an extension to the application layer 131 of the protocol stack 130. So long as messages for transmission continue to conform to a same type, then the template 116 is preserved. If the reduced message 115 with appropriate protocol headers and footers 121, 122, 123, 124 are beginning to be transmitted to the receiving server, then the template 116 is sent as the session setup message 145 to be installed as an extension of the receiving server's stack.

Initiating format template use may be carried out during a communication protocol handshake. Usually a handshake is only required at the beginning of a session to establish that the connection has been made. Once that is done, then it no longer matters what is passed between as far as connectivity is concerned, so no handshake is required when changing templates.

When messages no longer conform to the same type according to statistical analysis of the message elements, then the template 116 is changed and a new copy transmitted with the first message of the different type. The receiver uses statistical analysis of the reduced message with reference to stored templates to reconstruct the reduced message 115.

If the receiving server is in communication with other, similar sending clients, then the server may initiate a format template during initial communication protocol handshake by onward transmission of the template 116 it previously received from the first sending client to other such systems. This may then be implemented as a protocol stack extension at the sending client location for subsequent use in cutting down the out-coming messages.

A template of the outgoing message could be generated by stripping the tags and sending those as a separate session start-up message. However, the disadvantage of such a method is that all subsequent messages must conform to the format of the message upon which the template was based. Instead, the described method uses a set of structured algorithms which are generated allowing greater flexibility and adaptability.

A structured message 110 includes structural elements and data content elements, for example, in the form of tags and data fields between the tags. Probabilities are collected for any elements of the message 110 and overall probabilities are also generated for a message as a whole. The probabilities are used in various ways in the described method as follows.

The probabilities are used at a sender to assess if a template fits a structured message or if the template needs to be changed.

The probabilities are used to match elements in the message reconstruction at the receiver.

The probabilities are used to group templates in a range at a receiver.

A primary goal is to match a current message element entry against pre-stored probabilities; but at the same time, the probabilities are updated because the current entry is valid input data to be averaged for the pre-stored probability distributions. This is known in the art as "adaptive", because it adapts the pre-defined probabilities to reflect the real data seen in the field.

Probability theory for stochastic modelling is used by the described method for template matching. Qualities of the elements in the structured message are selected to be measured. When multiple qualities are used—such as the number of letters in a word and the frequency of occurrence of the word in a passage—there may be a correlation between those qualities. That is, if one quality is known, it may be possible to predict something about the other. The qualities may be, for example, the length of a data segment (the data between the tags), the number of words or units within that data segment, the number of non-alphanumeric characters, and so forth.

Consider the specific case, for instance, of the number of characters between the tags, or data length. With lots of samples, it is assumed that the distribution is a normal distribution. For example, if the average data set length (number of characters) for the tag <userid> . . . </userid> is 10, and the standard deviation plus or minus 0.5, then a field is located where the number of characters is 13, then this is plus 6 standard deviations away from the mean, and so the probability is going to be very small and just on length, it can be predicted that a data set with 13 characters is highly unlikely to be a <userid>.

In an example with two qualities, the number of characters in a field is used ("length") and the occurrences of that field across, say, 10 000 messages. Any individual data point represents both length and frequency of occurrence. As such, the data point will be better defined and more constrained and higher confidence can be given to assumptions made.

Suppose we have an average length of field of 10 characters, plus or minus 1; and an average occurrence over 10 000 messages of 7 000, plus or minus 50; then an actual data field that was 10 characters long, of a type occurring exactly 7 000 times in a sample of 10 000 messages, then a point represented by it would be right at the top of a two-dimensional distribution curve. Any variation in either measure would take it away from this position. Even if one measure remains constant, any variation in the other will move it down the curve of the distribution and in so doing, it becomes less likely to be the typical member of such a data set.

If other measures are taken, such as number of blanks in the field (which indicates how many items or "words" the field contains), this could be added to generate a three-dimensional distribution. The more measures taken, the more dimensions are needed, and the higher confidence there is in the statistical inferences associated with any data point.

In this case of tags, multiple two-dimensional distributions might represent different tags. The two qualities may be data length (the number of characters in the data field between the tags) and the frequency of occurrence of those tags within a given set of messages. Any input field from the current message being analysed on the sending or receiving side would have the values extracted (field data length and occurrence of tag) and then located within the distribution, using the two variable values as co-ordinates. Which distribution it falls into will be the most likely tag.

Figure 1C:
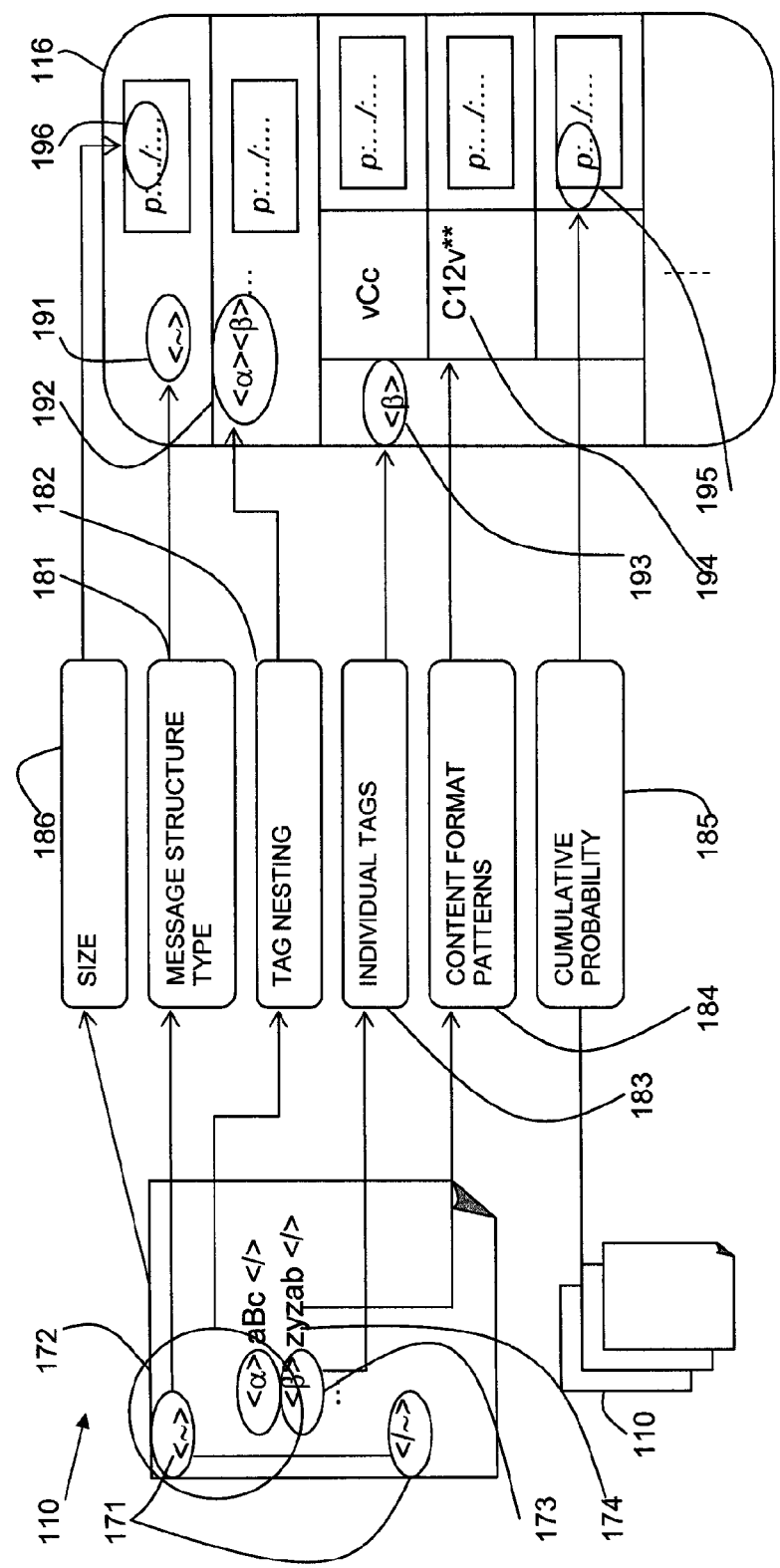

Referring to FIG. 1C, a structured message 110 is processed. The highest level tag 171, in this case "<~>", is stripped to identify the message type 181 and used in a field 191 in the template 116.

If the message type has not been seen before, then a new template is produced. The fields are as follows:
The outermost tag 171 is used to identify the type 181: Message Structure "type" 191.
The basic nested tag structure 172 is captured 182: Tag nesting 192. This is a listing of the tag nesting without the content, for example, <α><β>.
For each tag 173, an entry is made 183: Individual tags 193.
In each case and for each instance of a tag (it is possible for the same tag to be used on multiple occasions within the same message), a generic format 184 of the data 174 is created: Data content: "format patterns" 194. This could, for instance, be sequences of nT . . . where "n" refers to a non-zero integer, and T to a character: c and v for lowercase consonant and vowel respectively; C and V for uppercase variants; and D for digits; etc.

For all entries—structure type, tag nesting, individual tags, and format patterns—probabilities for qualities of the entries are saved in the template 116. For example, the length or size 186 of the message may be the quality of interest and stored in the template 196 together with its probability. Cumulative probabilities 185 for all message lengths are also stored.

If the message type has been seen before, then an existing template will already exist and it will be updated to reflect the current use of nested tags and data formats. Cumulative probabilities within the template 116 are modified accordingly based on the data and tags in the current message 110.

Irrespective of whether the message has been seen or not, qualities associated with it will be added to the statistical models to strengthen the shape of the distribution. This updating is the adaptation spoken of previously. The cumulative probability is the cross product of all probabilities for the individual elements within a message.

The structure analysis includes: finding the element tags; analyzing the probability of the contextual collocation of tags; and analyzing the probability of the content structure on a tag-type by tag-type basis. The content analysis includes: for those elements between tags, extract their overall structure type; and generate probabilities (likelihoods) associated with those structural types. The frequency of occurrence of character types (consonants, vowels, symbols and digits) is looked at as well as sequence patterns (Consonant-Vowel-Consonant syllable pattern, etc).

When a reduced message 115 is sent and compared against the template 116, then it will be possible to reconstruct the formatted, structured message 110 probabilistically with high accuracy.

In one embodiment, standard statistical matching is used in reconstruction of the message in which data content is matched against the longest sequence of characters stored in a template. The probability score is then used to see how likely it is that it is that sequence that matches. Length and probability are used in tandem to try and match the longest possible sequence. Further details are given in the worked example below.

Figure 2:
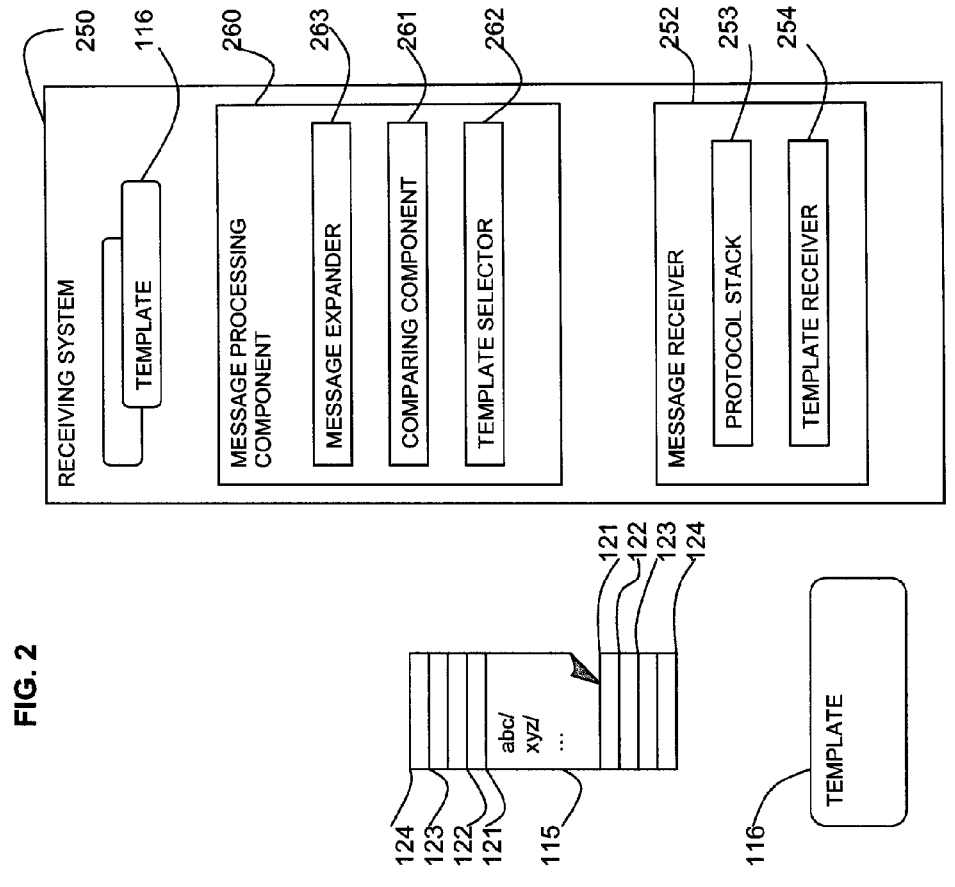
FIG. 2 is a block diagram of a system in accordance with a preferred embodiment of the present invention.
Figure 2:
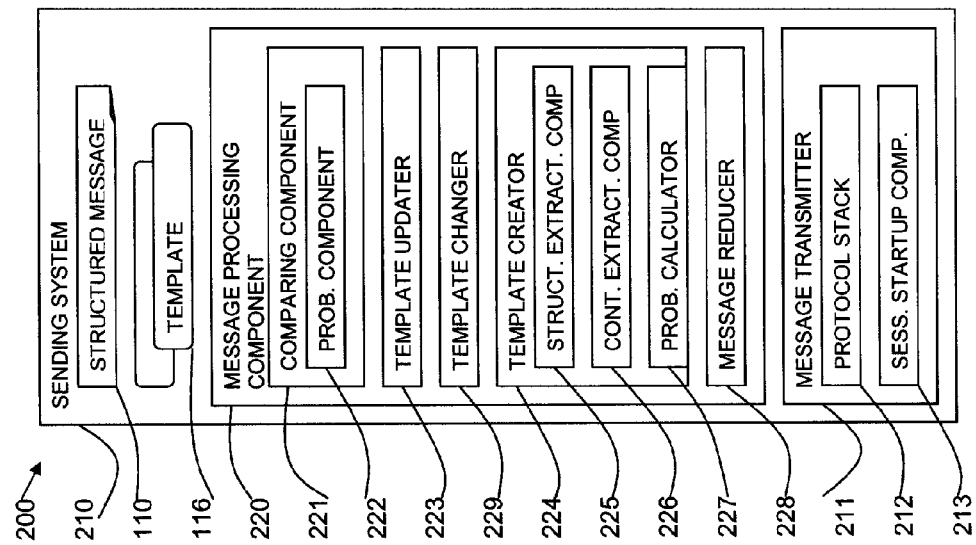

Referring to FIG. 2, a block diagram 200 shows the described system. A sending system 210 sends a message to a receiving system 250. The sending system 210 and receiving system 250 may be clients and servers, peer-to-peer systems, publish/subscribe systems, or any other architecture of message handling systems.

The sending system 210 has a structured message 110 which it wishes to transfer to the receiving system 250. The sending system 210 and receiving system 250 may start a communication session in which multiple messages are transferred.

The sending system 210 has a store of existing format templates 116 for message formats.

The sending system 210 includes a message processing component 220 including a comparing component 221 for comparing a message 110 to existing templates 116 for message formats. The comparing component 221 uses the structure and the content of the message 110 when comparing to existing templates 116. The comparing component 221 also includes a probability component 222 for determining a probability of the message 110 conforming to a template 116. The message processing component 220 includes a template updater 223 for updating existing templates 116 with probability data from the current message. The message processing component 220 includes a template changer 229 for changing to a different template if the probability of the current template fitting the message is low.

The message processing component 220 also includes a template creator 224 for creating a template if a template does not exist for a message type. The template creator 224 includes a structure extracting component 225, a content extracting component 226, and a cumulative probability calculator 227.

The message processing component 220 also includes a message reducer 228 for removing the formatting from the structure message 110 to form a reduced message 115 of raw content data.

The sending system 210 includes a message transmitter 211 with a protocol stack 212 for adding protocol layer headers and footers 121-124 to the reduced message 115. The protocol stack 212 includes an extension 135 to the application layer 131 in which the template 116 to be used is stored.

The message transmitter 211 also includes a session setup component 213 for transmitting the template 116 to the receiving system 250.

The receiving system 250 includes a store of existing format templates 116 for message formats.

The receiving system 250 includes a message receiver 252 with a protocol stack 253 for removing protocol layer headers and footers 121-124 from the received reduced message 115. The protocol stack 253 includes an extension to the application layer which adds the structure to the reduced message 115 in accordance with a template 116. The message receiver 252 includes a template receiving component 254.

The receiving system 250 includes a message processing component 260 including a comparing component 261 for comparing a reduced message 115 to current and stored templates 116 for message formats. The comparing component 261 uses the content of the reduced message 115 when comparing to the templates 116. The message processing component 260 includes a format selector 262 to select the appropriate template.

The message processing component 260 also includes a message expander 263 for adding the formatting to the reduced message 115 to form a structured message 110.

The receiving system 250 may also include a message transmitter 211 as shown for the sending system 210 for transmitting messages to other systems including forwarding templates 116.

Figure 3:
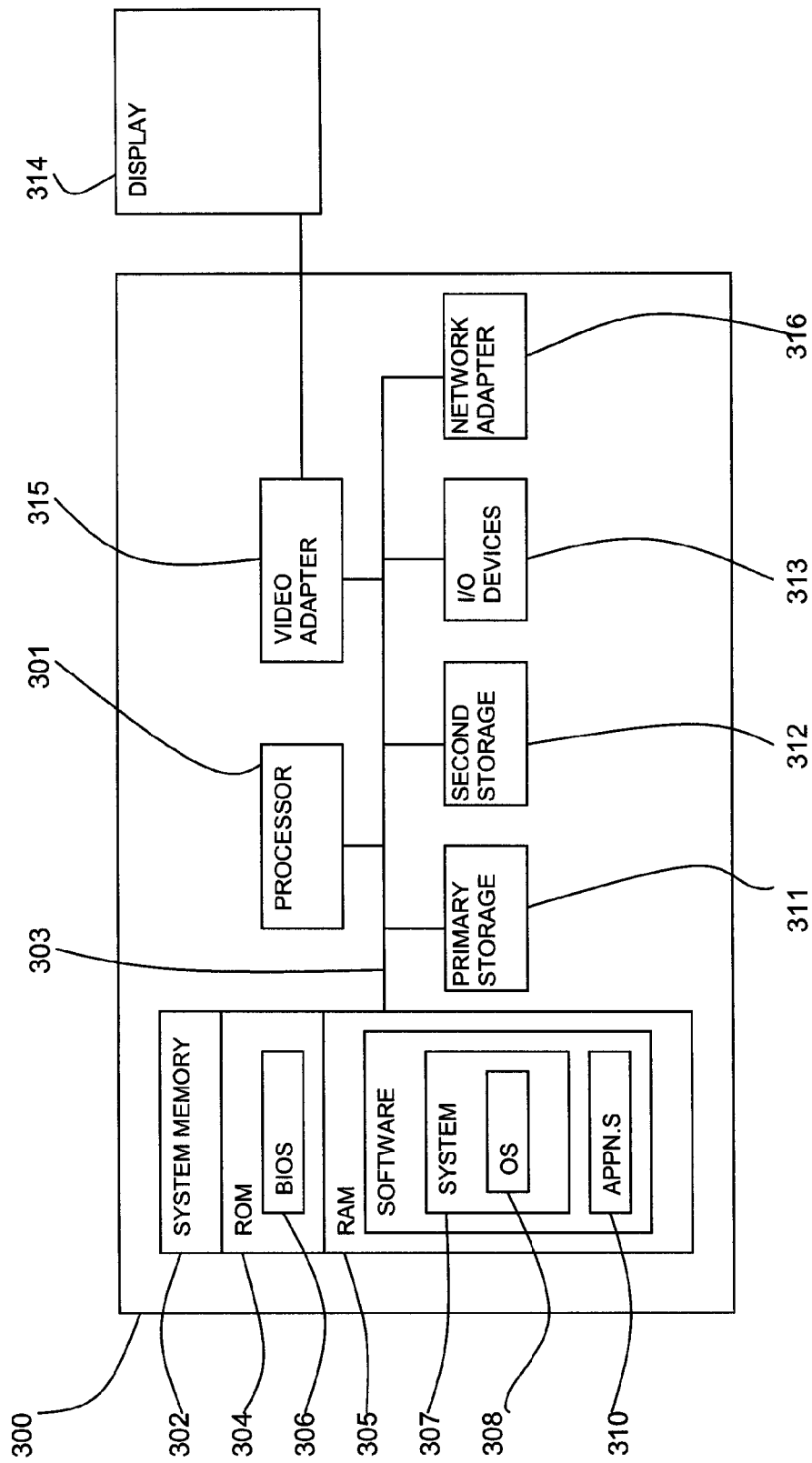
FIG. 3 is a block diagram of a computer system in which a preferred embodiment of the present invention may be implemented.

Referring to FIG. 3, an exemplary system for implementing sending and receiving systems includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
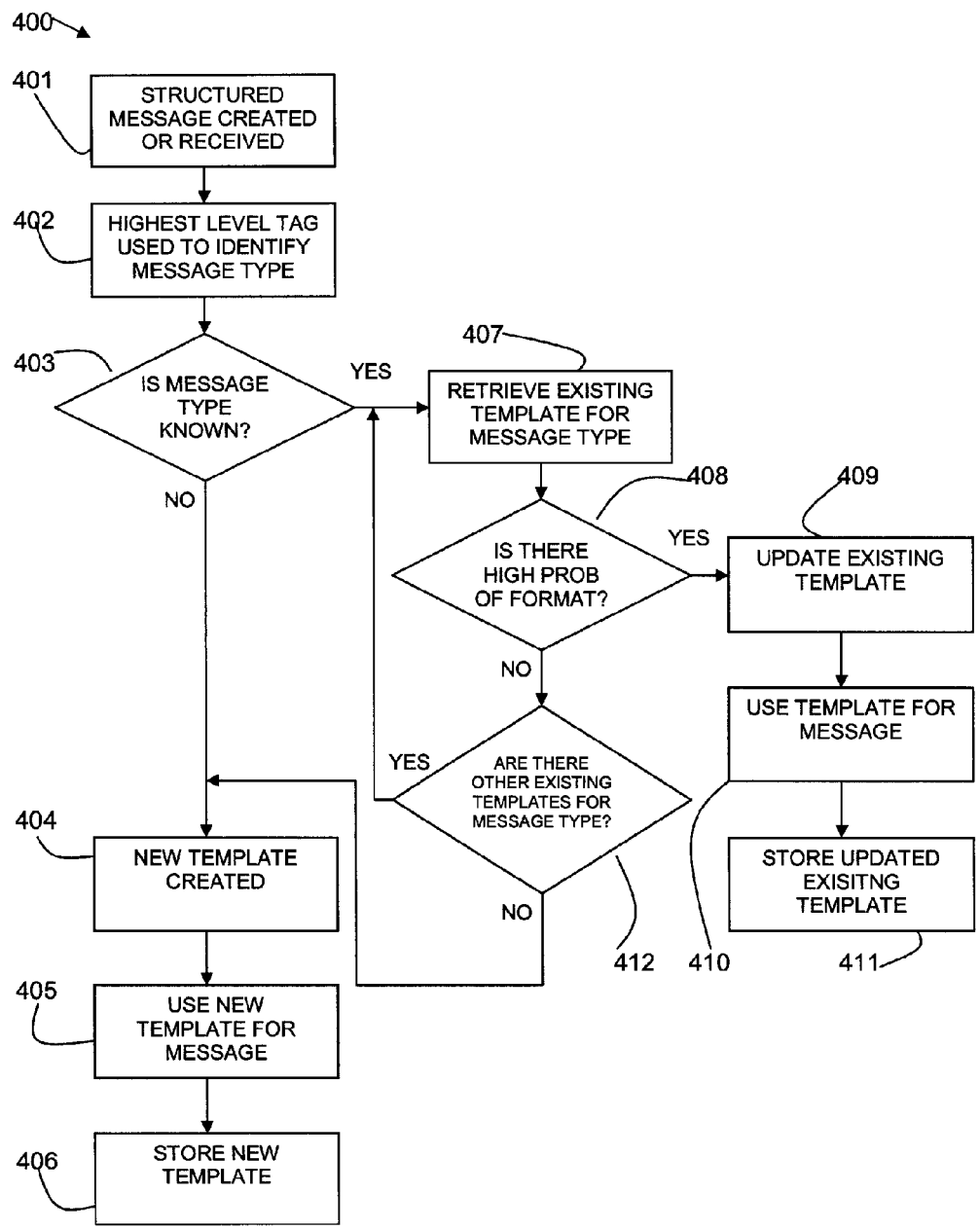
FIG. 4 is a flow diagram in accordance with a preferred embodiment of the present invention.

Referring to FIG. 4, a flow diagram 400 shows a method for message handling at a sending system. A structured message is created or received 401 and is destined to be transmitted to another receiving system. The highest level tag is stripped 402 from the structured message to identify the message type. It is determined 403 if the message type is already known.

Figure 5:
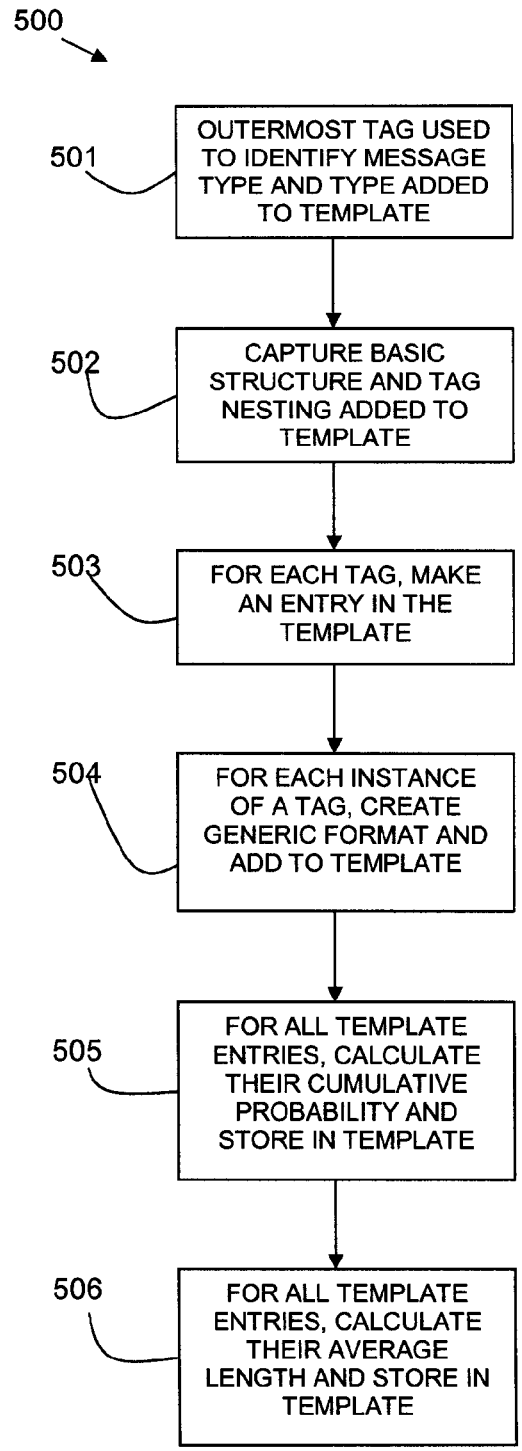
FIG. 5 is a flow diagram in accordance with a preferred embodiment of the present invention.

If the message type is not known, a new template is created 404 as shown in the flow diagram of FIG. 5. The new template is used 405 to reduce the structured message to a reduced message. The new template is stored 406 for future use.

If the message type is known, an existing template for the message type is retrieved 407. It is determined 408 if there is a high probability that the message is of the format of the retrieved template. In order to achieve this, the probability that a message comprises previously identified elements and the probabilities that elements conform to a previously identified format are determined. Multiple elements are considered, how likely they are to occur, and how likely they are to occur together.

For example, using the length of the message as the feature of interest, this is compared with the pre-stored cumulative probabilities of all message lengths. A match occurs when the length of the current message is within the defined thresholds with the probability distribution for that parameter. So, the analysis is carried out on an ongoing basis to gather the statistics used to generate the probability curve; on an individual basis, a match is done against the probability curve.

For each element of a message there would be an associated probability. For instance, one relating to the sequence of tags; another to the data length for the first tag; for the second tag . . . etc; and then for any other features. The overall probability for the whole message is calculated by multiplying all individual probabilities.

If there is a high probability that the message is of the format of the retrieved template, the existing template is updated 409 to reflect the cumulative probability of the current message matching that template. Thus, over time, the message flow itself is used to weight pre-stored templates. The updated existing template is then used 410 for the current message. The updated existing template is stored 411 for future use.

If there is not a high probability that the message is of the format of the retrieved template, it is determined 412 if there are other existing templates for the message type. If there are other existing templates, the method loops to retrieving 407 the next existing template for the message type. If there are not other existing templates for the message type, the method proceeds to creating 404 a new template.

The matching of a template is only ever as sure as the probability of the message being of that type. For adaptation (updating) then the criteria tend to be a lot stricter than a simple match. All parts of the template have a probability score associated with them. Some elements will correlate and therefore the combination of those elements carries the score.

The running total of the cumulative probability over the whole message is maintained and there may come a time where the probability is so low that the current message is highly unlikely to match to any particular or any known template. For individual templates, any future matching is abandoned against those individual templates (so the search space decreases).

The sender-side makes the decision when to send a new template or can re-transmit a previous template, if required, as message types revert to the previous type. The template is associated with the session (i.e., the current communication between sender and receiver) and does not drift as the session progresses, until a new template is sent.

Referring to FIG. 5, a flow diagram 500 shows a method of creating a new template for reducing a message for transmission.

The outermost tag is used 501 to identify the message type and add Message Structure "type" to the template. The basic nested structured is captured 502 in the form of a list of nested tags without the content and stored as Tag nesting in the template. For each tag, an entry is made 503 in the template: Individual tags. In each case and for each instance of a tag (it is possible for the same tag to be used on multiple occasions within the same message), a generic format of the data is created 504: Data content: "format patterns". For all entries, for example, structure type, tag nesting, individual tags, and format patterns, their cumulative probability p is calculated 505 and stored in the template and their qualities such as average length l are calculated 506 and saved in the template.

Figure 6:
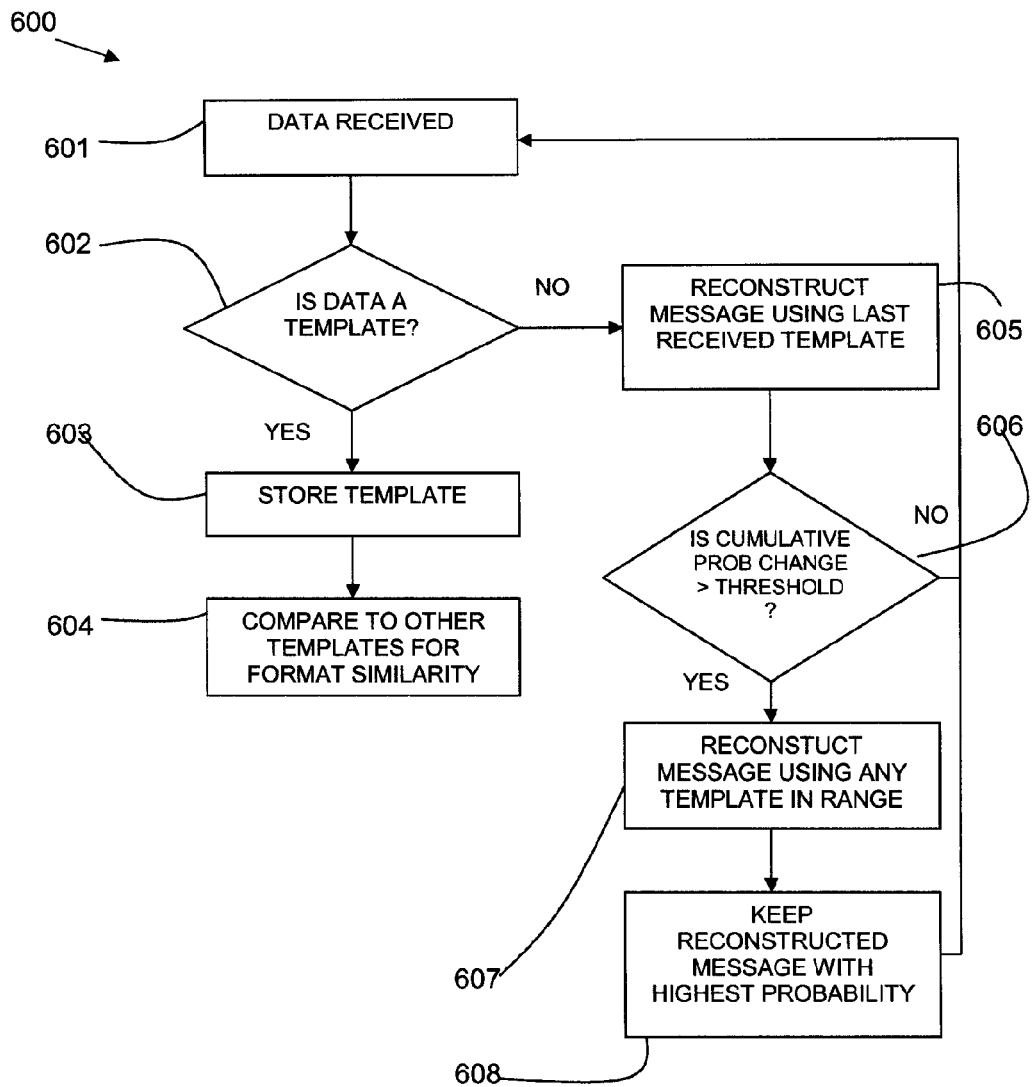
FIG. 6 is a flow diagram in accordance with a preferred embodiment of the present invention.

Referring to FIG. 6, a flow diagram 600 shows an embodiment of a method for message handling at a receiving system.

The receiver receives data 601 and determines 602 if the data is a template. If it is a template, the receiver stores 603 the template along with pre-stored templates. The receiver compares 604 the templates for format similarity using the stored element probabilities.

If the data is not a template, it is a reduced message and the receiver reconstructs 605 the message using a template.

A message may be reconstructed in one of two ways: using the most recent template and seeing if the cumulative probability for the whole message is above an operational threshold; or iteratively through stored templates, until that threshold is reached/passed.

The cumulative probability of the whole message is calculated and it is determined 606 if the cumulative probability change for the message is above a given threshold. If it is above the given threshold, then the receiver also reconstructs 607 the message against any template within a certain range of the new template as identified in step 604. If the change is above the threshold, the match between the message and the template is poor, therefore, the message is reconstructed against other templates in a range and the template with the best probability fit is used.

The receiver keeps 608 the reconstruction with the highest probability and loops to await more data 601.

The receiver stores (caches) the previous N templates on a session. It can recover any failures without requesting a resend. It is less processor intensive and can potentially handle message transmissions from multiple sources. Retaining templates makes recovery and problem determination significantly easier.

At receiver end, there is only a matching capability. It does not need to be able to analyze structure and content to maintain the template.

Figure 7:
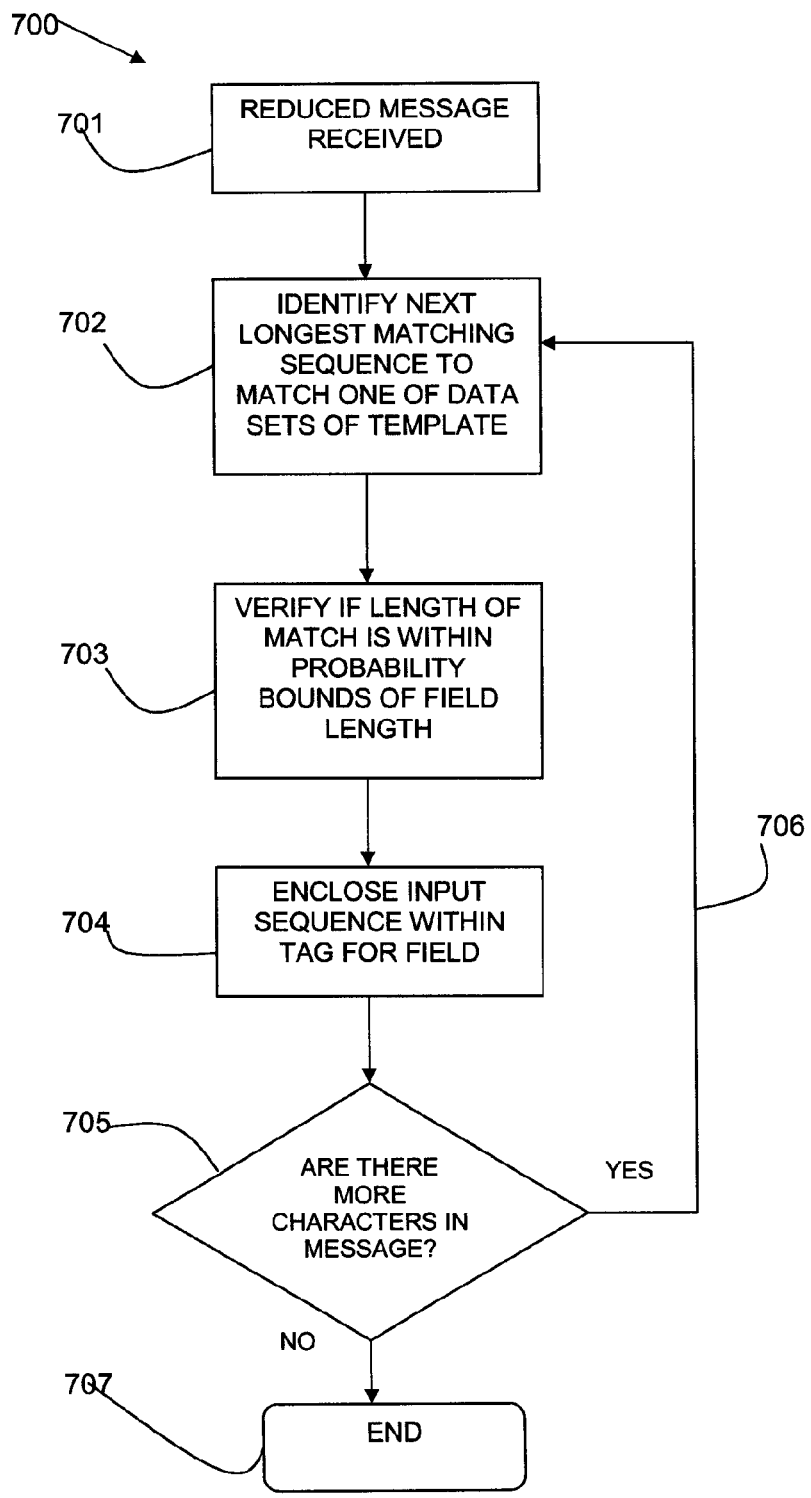
FIG. 7 is a flow diagram in accordance with a preferred embodiment of the present invention; and h.

Referring to FIG. 7, a flow diagram shows an embodiment of message reconstruction at a receiver. A reduced message is received 701 and the longest sequence of characters to match one of the data sets of the template is selected 702. It is verified 703 if the length of the match is within the probability bounds of the length field. If so, the character sequence is enclosed 704 within the tag for the field. It is determined 705 if there are more characters. If so, the method loops 706 to the next longest sequence of characters at step 702. If there are no more characters, the method ends.

Using the longest sequence is one method of message reconstruction and is a way of trying to avoid having to repeat matches. If there is a match for a short sequence, then it is necessary to do a match for the short sequence plus one character and so on till it fails.

Figure 8:
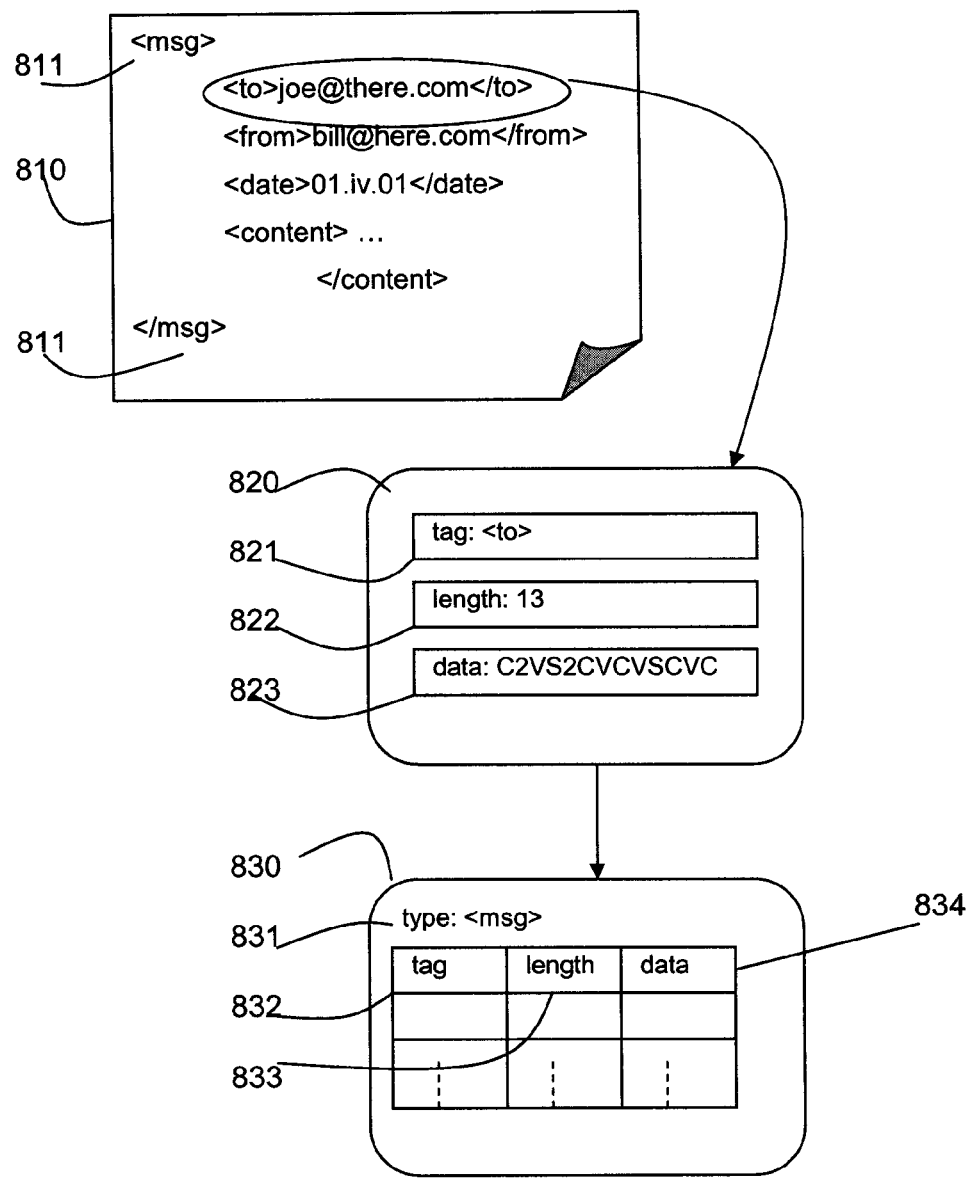
FIG. 8 is a schematic diagram of an example of message handling in accordance with a preferred embodiment of the present invention.

Referring to FIG. 8 an example is described and shown. A message 810 is handled. By way of illustration, the message 810 is an eMail or similar person-to-person communication. The outer tags 811 of the message 810, namely <msg> . . . </msg> are stripped and stored in a message matching matrix 830 to identify the message type 831. Any data section within the message 810 is now processed from opening to closing tag. To illustrate what tags are, the following is considered. Two separate tags may be encountered as in the example:

<to>joe@there.com</to>

The opening tag, <to> and corresponding closing tag </to> are separated by the data content: joe@there.com. These tags can be identified in the following way: an opening tag begins with the first instance of "<", followed by any character other than "/", followed by some text (the tag name) and a ">". The corresponding closing tag begins "<", followed by "/" and the same tag name as the opening tag, and ">".

With the opening tag, there may also be attributes, such as <to type=email>, where the "type" is the attribute, and "email" the value of that type. To cater for this variant, the tag name is identified as all characters up to and excluding any blank (" ") or ">".

A final variant occurs when there is no separate closing tag. Consider:

<language alphabet=roman/>.

Using the identifying steps above, "language" would be identified as the tag name, "alphabet" as an attribute, and "roman" as the value of that attribute. However, there is no corresponding </language> expected since there is the closing tag "/>" marker within the opening tag. These kinds of tags, where there is no data content between opening and closing tag, define attributes which are associated with the whole message rather than a specific part (the data content between the tags) of the message. Identifying tags therefore needs to allow for separate opening and closing tags, combined opening and closing tags with no data content, and optional attributes within the opening tag.

The tag and its contents (that is the information between opening and closing tags), in this example "<to>joe@there.com</to>", is now sent for initial analysis at a temporary stage 820. Here, the tag 821 is identified ("to"); the length of the contents 822 (the number of characters between ">" and "<"; this would be zero for the "<language type=roman/>" case);

and the character types of the contents 823, where "C" means a consonant; "V" a vowel; "S" a symbol; and "D" a digit. A numeric preceding one of these refers to the number of such types: "2C" means "two consonants" therefore. This temporary stage 820 now feeds into the main matching matrix 830.

There is a separate matching matrix 830 for each message type 831. In this case, the matrix 830 refers to messages of type "<msg>". There is a separate entry in the matrix 830 for each tag 832 contained within messages of type "<msg>"; in this example, for <to>, <from>, <date> and <content>. Note that if any of these tags 832 had nested content, then there would be a separate matching matrix containing the nested tags. For example: if there was:

<date><day>01</day><month>iv</month><year>01</year></date>
then there would be a "<date>" matching matrix 830 with table entries for <day>, <month> and <year>.

When entering the data from the temporary stage 820 to the matching matrix 830, then any numeric value such as the length field 833 would contain the average length calculated over all the messages handled so far and some probability measure, such as the 90% and +/−5% margins for the length. The data field 834 would either contain similar information for each content type (e.g. "C2VS2C . . . " from the example here, and "CVC" and "VVS" etc. for other contents) along with length and probability measures or a further summary by character ("C" plus probability; "V" plus probability; "S" plus probability, where the probabilities would sum to 100% for each character position). The matching matrix 830 is used within the preferred embodiment as the template 116.

During message transmission, each outgoing message from the sender is used to update the probability measures within the template 116. Beyond a given threshold, for instance when values change by more than +/−2%; or when a tag entry changes, then a new version of template 116 is sent to the receiver.

During message receipt, the contents will have been stripped of tags. In this example, then the message will be: joe@there.combill@here.com01.iv.01 . . . and so forth. Using the current template 116, the formatted message can begin to be reconstructed as follows:
take the longest possible input sequence to match one of the data sets in the matching matrix: joe@there.com matches C2VS2CVCVSCVC;
verify that the length of the match is within the probability bounds of the associated length field: e.g. If the length field in the matching matrix here were 17, and the +/−2% to give say 15 and 18, then the actual length of this input sequence (16 characters) would be within the acceptable range and the length match would be successful;
enclose the input sequence within the tag identified in the associated tag field: <to>joe@there.com</to>.

This is repeated through the entire raw character (or "byte") sequence.

Over time, two things will happen. Firstly, the probability measures associated with specific sequences within a template will become increasingly stable. Any deviation, however small, will typically result in a separate, though very similar template. Secondly, with multiple templates available, any message can be matched using standard techniques against similar templates and the template with the highest cumulative probability score identified as the one appropriate to handle this particular message.

Therefore, in the example above, where a 16 character sequence fell within a permitted 2% range around the most common 17, it might be assumed that the template provides a good match. If, however, a similar template had a value of 17 and 16 fell within a 1% range, then this would be a still better match. Over all the matching sequences and tags within candidate templates a cumulative probability can be calculated associated with the closeness of match (here 2% versus 1% for this individual tag). The best score (the lowest overall deviation from the average values) would identify the best template for the message in question.

The generation of a new template and when to send the new template may be independent. For example, there may be provided previously learned templates.

The structure and the contents of the messages are analyzed. Analyzing the structure means that the algorithm is more generic and can potentially be applied effectively to more messages sharing the same or similar type, but having different content.

The described technique applies to different documents: one algorithm will cover many once generated. The technique calculates the algorithm, determines when to change algorithm based on message/document content, and optimizes on content types during network transmission, i.e. the technique is message content adaptive.

The technique looks at probability of occurrence either of tags or for format patterns of the content, generalizes across message types, and looks at both tag structure and data content. Related tags are replaced with a probability of occurrence. A likelihood mapping of the structure is used.

The described method is associated with sessions and therefore can deal with multiple messages, and multiple connections. Once a template is available, a best-match approach is used to decide whether the template is sufficient, or whether to switch templates.

The described method and system are capable of multi-threading, dealing with many (thousands or more) of messages together.

The described method and system provide a robust and flexible technique for handling high volumes of messages in multiple communication frameworks (point-to-point, publish-subscribe, etc) with very little processor overhead.

The described method and system are applicable to many different environments and data types, from simple machine-to-machine to more complex systems, such as mobile telephony and data connections; video and audio transmission; all across low or limited bandwidth connections.

Using the described method and system, bandwidth on the communication link as well as other throughput characteristics are advantageously affected.

Message handling including template creation may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for message handling, wherein a structured message is transmitted as a reduced message with the structure removed, the method comprising:
    monitoring messages to be transmitted, the step of monitoring comprising:
    for each message, identifying one or more elements within the message and structural information associated with the one or more elements;
    determining the probability that a message will conform to a previously identified format based on the identified elements and the structural information associated therewith; and
    using the determined probability to decide when to transmit a format template for the message, wherein the format template contains structural information for use by a destination to add the structure removed by a message source back into the message.

2. The method as claimed in claim 1, including comparing a message with one or more stored format templates.

3. The method as claimed in claim 2, including updating a format template to include the cumulative probability of elements of a current message conforming to a previously identified format.

4. The method as claimed in claim 1, including creating a format template using information about the structure of the message to generate descriptive information that can be used by a destination to reconstitute the message.

5. The method as claimed in claim 4, wherein creating a format template is based on structure and content of a message.

6. The method as claimed in claim 4, wherein creating a format template includes:
    identifying elements for generic structure in terms of taggings and nesting;
    extracting content patterns; and
    attributing likelihood scores to each of the elements.

7. The method as claimed in claim 1, wherein message handling to reduce a message and message reconstitution are carried out in the protocol stack.

8. The method as claimed in claim 1, including identifying a format template with a first outgoing message in a session and when changing to a different format template.

9. The method as claimed in claim 1, including initiating format template use during communication protocol handshake.

10. The method as claimed in claim 1, including using a highest level tag of a message to identify a message type, and using the message type to identify format templates.

11. The method as claimed in claim 3, wherein creating a format template includes generating template entries from:
    a message type,
    a nested structure of tags,
    each tag,
    a generic format for each instance of a tag based on the content of the instance; and
    a cumulative probability of each format template entry.

12. The method as claimed in claim 1, wherein at a destination, retaining previous format templates in a session with a message source, and comparing a received reduced message with the format templates, and selecting a best format template based on a cumulative probability of the whole message in the format template.

13. A computer software product for message handling wherein a structured message is transmitted as a reduced message with the structure removed, the product comprising a computer-readable storage medium, in which program comprising computer-executable instructions are stored, which instructions, when read and executed by a computer, perform the following steps:
    monitoring messages to be transmitted, the step of monitoring comprising:
    for each message, identifying one or more elements within the message and structural information associated with the one or more elements;

determining the probability that a message will conform to a previously identified format based on the identified elements and the structural information associated therewith; and using the determined probability to decide when to transmit a format template for the message, wherein the format template is contains structural information for use by a destination to add the structure removed by a message source back into the message.

14. A system for message handling, wherein a structured message is transmitted as a reduced message with the structure removed, comprising:

a memory for storing one or more format templates containing structural information for adding structure back to a reduced;

processor configured for monitoring messages to be transmitted by performing the steps including:

for each message, identifying one or more elements within the message and structural information associated with the one or more elements;

determining the probability that a message will conform to a previously identified format based on the identified elements and the structural information associated therewith; and using the determined probability to decide when to transmit a format template for the message, wherein the format template is contains structural information for use by a destination to add the structure removed by a message source back into the message.

15. The system as claimed in claim 14, wherein a format template is updated to include the cumulative probability of elements of a current message conforming to a previously identified format.

16. The system as claimed in claim 14, including wherein a format template is created using information about the structure of the message to generate descriptive information that can be used by a destination to reconstitute the message.

17. The system as claimed in claim 14, including an extension to a protocol stack to reduce a message at a sender and message reconstitution at a destination.

18. The system as claimed in claim 14, wherein a format template is identified with a first outgoing message in a session and when changing to a different format template.

19. The system as claimed in claim 14, wherein a highest level tag of a message is used to identify a message type, and the message type is used to identify format templates.

20. The system as claimed in claim 14, including a destination system (250) having a store of previous format templates in a session with a message source.

21. The system as claimed in claim 16, wherein creating a format template (116) includes generating template entries from:

a message type;

a nested structure of tags;

each tag;

a generic format for each instance of a tag based on the content of the instance; and a cumulative probability of each format template entry.

22. The system as claimed in claim 14, including at a destination system, a store of previous format templates, and a processor configured for comparing a received reduced message with the format templates, and selecting a best format template based on a cumulative probability in the format template.

23. The system as claimed in claim 14, wherein at a destination system, a received reduced message is expanded by sequence matching to fields in a template (116).

* * * * *